United States Patent [19]

Williams

[11] 4,249,342
[45] Feb. 10, 1981

[54] PLANT SUPPORT

[76] Inventor: Wilburn R. Williams, Rte. 2, Atoka, Okla. 74525

[21] Appl. No.: 56,537

[22] Filed: Jul. 11, 1979

[51] Int. Cl.³ .......................................... A01G 17/04
[52] U.S. Cl. ........................................................ 47/43
[58] Field of Search ...................................... 47/42–43; 248/530, 533, 351, 354 L, 511

[56] References Cited

U.S. PATENT DOCUMENTS

| 720,667 | 2/1903 | Cartwright | 47/43 |
| 2,501,255 | 3/1950 | Bell | 47/43 |

FOREIGN PATENT DOCUMENTS

| 2430 | 6/1900 | Austria | 47/43 |
| 191937 | 1/1907 | Fed. Rep. of Germany | 47/42 |
| 1105561 | 12/1955 | France | 47/43 |
| 242296 | 9/1946 | Switzerland | 47/42 |

*Primary Examiner*—Robert E. Bagwill
*Attorney, Agent, or Firm*—Laney, Dougherty, Hessin & Beavers

[57] ABSTRACT

A plant support apparatus including first and second collar portions forms a cylindrical collar. A rectangular flange extending from an end of the cylindrical collar includes holes for connecting guidelines thereto. The flange includes a pair of arcuate slots disposed therein on opposing sides of a plane about which said cylindrical collar is split, with radially outer sides of said slots open to opposing sides of said rectangular flange. The collar portions are held together by flexible lines engaging notches of the arcuate slots.

10 Claims, 6 Drawing Figures

PLANT SUPPORT

BACKGROUND OF THE INVENTION

1. Field of the Invention

This invention relates generally to apparatus for supporting plants, and more particularly, but not by way of limitation, to apparatus for supporting plants by means of guidelines attached to a collar surrounding a stem of the plant.

2. Description of the Prior Art

The prior art includes numerous devices for supporting plants, which devices include a collar surrounding the trunk or stem of the plant and a plurality of guidelines connected between the collar and a ground surface.

U.S. Pat. No. 4,073,090 to Lucia discloses a tree trunk grasping collar 1, which surrounds the tree trunk and is staked to the ground by means of guy wires 5. The collar disclosed by Lucia is a one piece flexible collar.

U.S. Pat. No. 3,494,072 to Olson discloses a two piece collar having the two pieces hingedly connected at point 13. The apparatus of Olson does not use guy wires, but rather uses the two piece collar to encircle both the stem of a plant and a support member 22.

U.S. Pat. No. 2,501,255 to Bell discloses a two piece splint structure having a plurality of rigid leg support members 32a and 33.

Other references illustrating the state of the art in plant support devices are found in U.S. Pat. No. 3,521,401 to Shisler, No. 3,505,761 to Prieur, No. 3,226,882 to Lichtenthaler, No. 3,010,256 to Ise, and No. 2,296,217 to Maloney.

Thus it is seen that the prior art recognizes the need for a three support apparatus, and includes such apparatus having a collar surrounding the tree with means attached to the collar for supporting the tree. The prior art does not, however, disclose or suggest the particular plant support structure of the present invention having an improved collar means and means for attaching guidelines as is further described below.

SUMMARY OF THE INVENTION

A plant support apparatus is provided including first and second semi-cylindrical collar portions which are combined together to form a cylindrical collar for placement about a stem of the plant. The cylindrical collar includes upper and lower flanges extending radially outward from upper and lower ends of the cylindrical collar in planes normal to a longitudinal axis of the cylindrical collar.

Each of the collar portions include upper and lower flange portions which comprise a part of the upper and lower flanges, respectively. Each flange portion includes an arcuate slot forming notches in the flange portion at each end of each slot. The collar portions are held together by flexible lines which are engaged with the notches of both flange portions and tied so as to hold the flange portions together.

The upper and lower flanges of the plant support apparatus include means for attaching guidelines to the plant support apparatus for supporting the plant.

It is therefore a general object of the present invention to provide an improved plat support apparatus.

Another object of the present invention is the provision of a plant support apparatus comprising two semi-cylindrical halves with flange portions extending radially outward from upper and lower ends of said semi-cylindrical halves.

Yet another object of the present invention is the provision of a plant support apparatus including a flange portion extending radially outward from a collar portion in a plane normal to a longitudinal axis of the collar portion, including attachment means disposed in said flange.

Other and further objects, features and advantages of the present invention will be readily apparent to those skilled in the art upon a reading of the following disclosure in conjunction with the drawings.

DETAILED DESCRIPTION OF THE PREFERRED EMBODIMENTS

Figure 2:
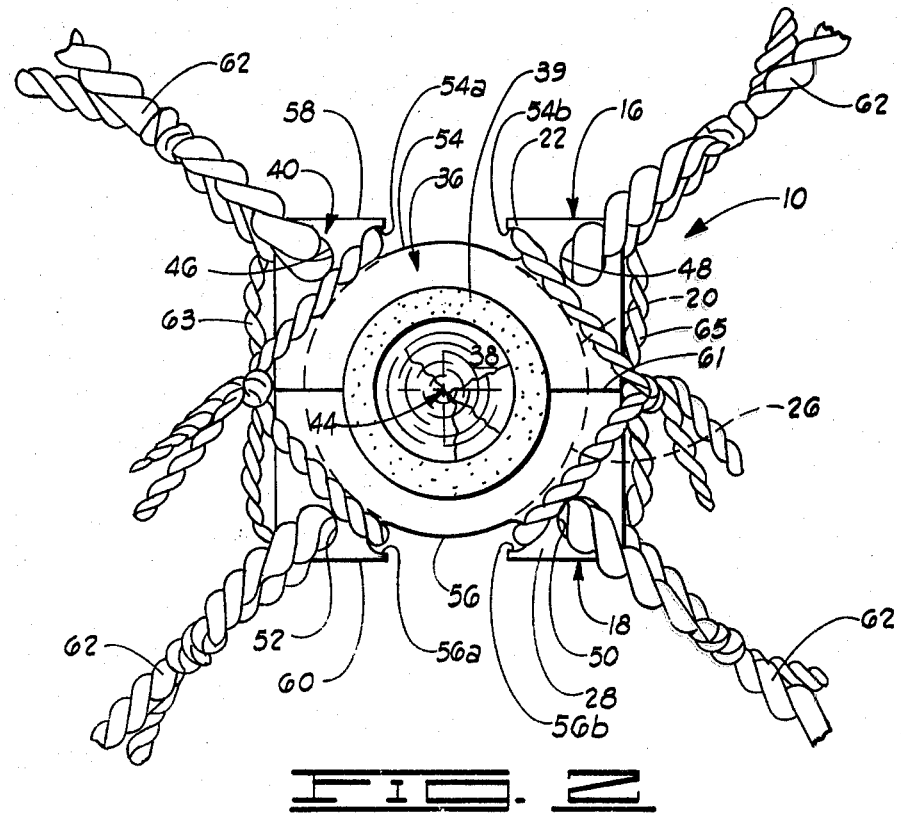
FIG. 2 is a section view along line 2—2 of FIG. 1.

Referring now to the drawings and particularly to FIG. 2, the plant support apparatus of the present invention is shown and generally designated by the numeral 10. As is shown in FIG. 2, the plant support apparatus 10 is generally used in conjunction with a plant such as tree 12 to support the same by connecting it to a ground surface 14.

The plant support apparatus 10 includes first and second collar portions 16 and 18. First collar portion 16 includes a semi-cylindrical middle portion 20 and upper and lower flange portions 22 and 24, respectively. Similarly, second collar portion 18 includes a semi-cylindrical middle portion 26 and upper and lower flange portions 28 and 30.

When held together as illustrated in FIG. 2, the semi-cylindrical middle portions 20 and 26 are combined to form a cylindrical collar means 36, for surrounding a stem 38 of tree 12. A sheet 39 of foam rubber padding or the like is wrapped around the stem 38 before the collar means 36 is placed thereon. The padding sheet 39 protects stem 38 and allows growth thereof.

The upper flange portions 22 and 28 of collar portions 16 and 18, combine to form an upper flange 40. The lower flange portions 24 and 30 of collar portions 16 and 18 combine to form a lower flange 42.

Each of the upper and lower flanges 40 and 42 may be described as a substantially rectangular flange extending radially outward from upper and lower ends, respectively, of cylindrical collar means 36 in planes normal to a longitudinal axis 44 of cylindrical collar 36.

Upper flange 40 includes a plurality of attachment means 46, 48, 50 and 52 each of which comprise a cylindrical hole disposed through rectangular upper flange 40 parallel to longitudinal axis 44 of cylindrical collar 36. The holes 46, 48, 50 and 52 are each located adjacent a corner of rectangular upper flange 40.

Upper flange 40 includes two arcuate slots 54 and 56 concentric with cylindrical collar 36 and having a radially outer side thereof open adjacent one of two opposing sides 58 and 60 of rectangular upper flange 40. Lower flange 42 similarly includes two arcuate slots 57 and 59.

The opposing sides 58 and 60 are parallel to a plane 61 about which the cylindrical collar 36 is split into the two semi-cylindrical halves 20 and 26.

Figure 5:
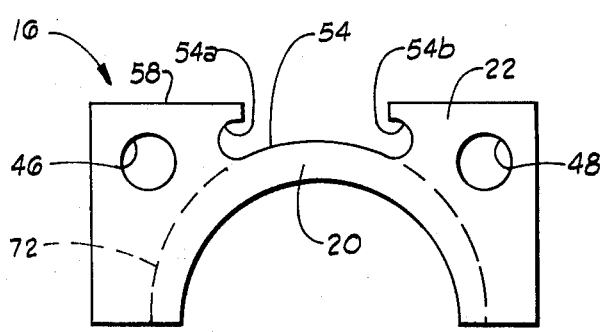
FIG. 5 is a plan view of one of the collar portions, illustrating a flange portion thereof.

As is best seen in FIGS. 2 and 5, each of the arcuate slots forms notches at each end thereof. slot 54 forms notches 54a and 54b. Slot 56 forms notches 56a and 56b.

First and second collar portions 16 and 18 are held together by a holding means comprising lengths of rope 63 and 65. Rope 63 engages notches 54a and 56a is then tied in a snug fashion. Rope 64 is tied in a similar manner engaging notches 54b and 56b. Although ropes 63 and 65 are tied tightly to hold collar portions 16 and 18 together, ropes 63 and 65 are sufficiently flexible that they can stretch a reasonable amount as tree 12 grows, so that the tree 12 will not be damaged.

The attachment means 46-52 provide means for attaching guidelines 62 to upper flange 40. Guidelines 62 may be generally referred to as support means.

Figure 1:
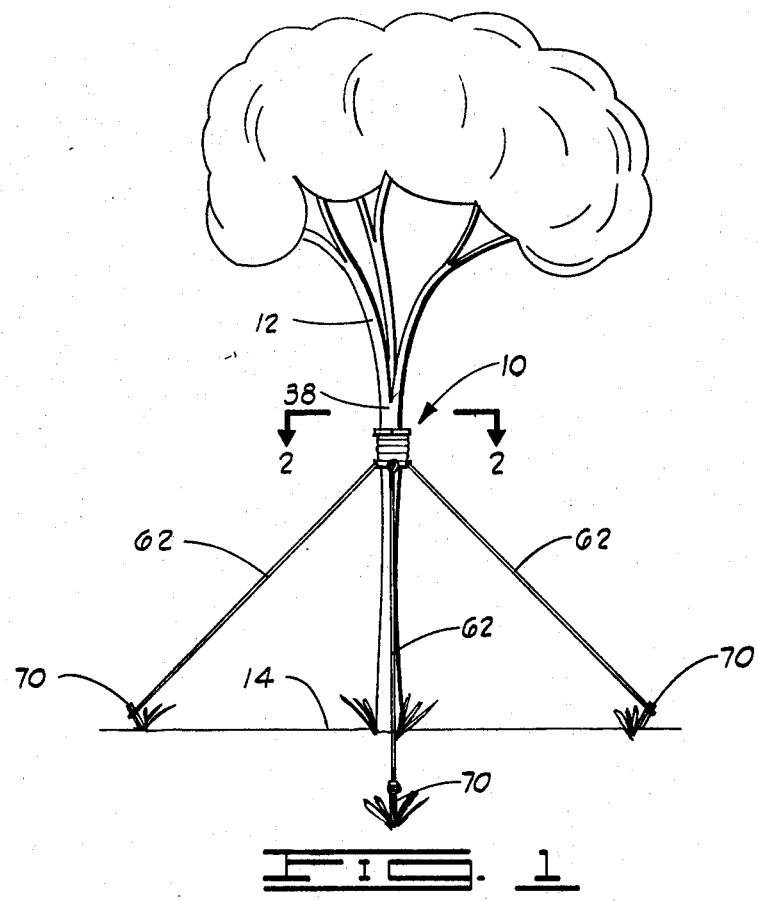
FIG. 1 is a schematic elevation view of the plant support apparatus of the present invention as attached to a tree with four guidelines connected to the plant support apparatus.

As illustrated in FIG. 1, the guidelines 62 are preferably attached to stakes 70 which are driven into the ground surface 14.

Figure 6:
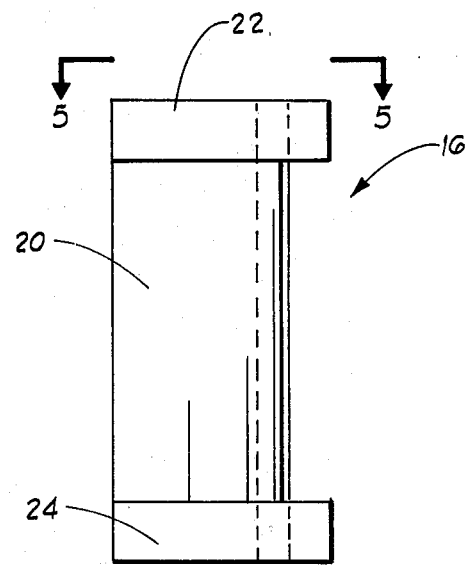
FIG. 6 is an elevation view of the collar portion of FIG. 5.

The construction of first collar portion 16 is further illustrated in FIGS. 5 and 6. FIG. 6 is an elevation view of first collar portion 16, and FIG. 5 is a top plan view as seen along line 5—5 of FIG. 6.

The use of plant support apparatus 10 is as follows. The flexible foam sheet 39 is wrapped around stem 38 and then the first and second collar portions 16 and 18 are placed about sheet 39. Then the flexible ropes 63 and 65 are tied between notches 54a, 56a and 54a, 56b, respectively, to hold first and second collar portions 16 and 18 together. Guidelines, such as guidelines 62, are then connected to upper flange 40 by connection to one of the attachment means 46-52. The guidelines 64 are then connected to stakes 70 and tightened so as to provide support to the tree 12 through tension in the guidelines 62.

Figure 3:
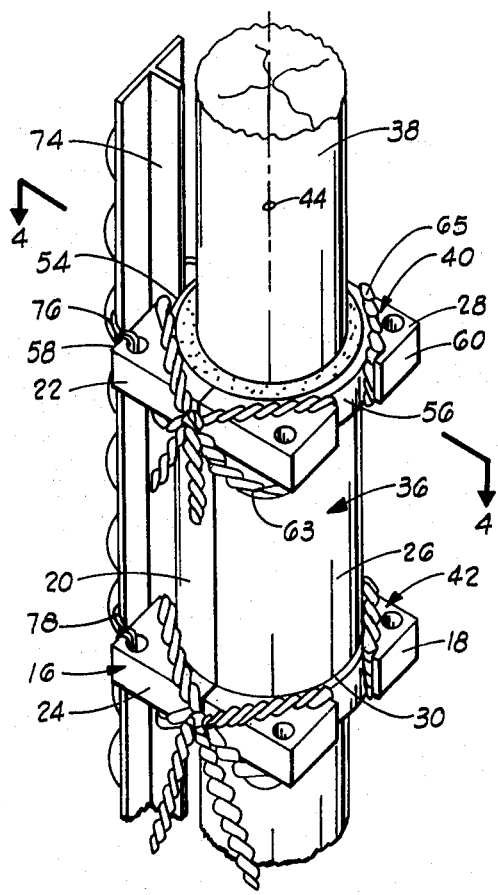
FIG. 3 is an isometric view of the plant support apparatus of the present invention utilized in an alternative fashion with a vertical support post rather than guidelines.

An alternative manner of utilizing plant support apparatus 10 is shown in FIG. 3. Rather than using guidelines 62, a vertical support member 74 is driven into the ground parallel to stem 38. Portions of wire 76 and 78 are then placed around the support member 74 and tied to the holes in upper and lower flanges 40 and 42. The wires 76 and 78 are not actually tied to support member 74, therefore upward growth of tree 12 is not restrained.

Figure 4:
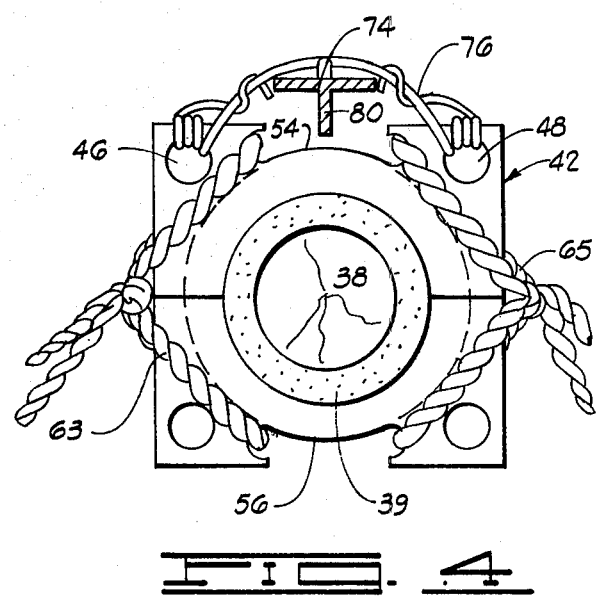
FIG. 4 is a section view along line 4—4 of FIG. 3.

As is best seen in FIG. 4, support member 74 has a T-shape cross section, with the center leg 80 of the T protruding into slot 54.

Thus the tree support apparatus of the present invention is well adapted to carry out the objects and obtain the ends and advantages mentioned, as well as those inherent therein. While presently preferred embodiments of the invention have been described for the purpose of this disclosure, numerous changes in the construction and arrangement of parts can be made by those skilled in the art, which changes are encompassed within the scope and spirit of this invention as defined by the appended claims.

What is claimed is:

1. A plant support apparatus, comprising:
a first collar portion having a semi-cylindrical middle portion with a flange portion at an end of said middle portion;
a second collar portion having a semi-cylindrical middle portion with a flange portion at an end of said middle portion;
holding means for holding said first and second collar portions together so that said semi-cylindrical middle portions thereof form a cylindrical collar means for surrounding a stem of a plant, said flange portions of said first and second collar portions forming a flange extending radially outwardly from said cylindrical collar means in a plane normal to a longitudinal axis of said cylindrical collar, said flange including attachment means for attaching collar, said flange including attachment means for attaching a plurality of guidelines thereto; and
a plurality of guidelines connected between said attachment means and a ground surface to support said plant.

2. Apparatus of claim 1, wherein said attachment means comprises a plurality of holes disposed through said flange.

3. Apparatus of claim 2, wherein said flange is further characterized as being substantially rectangular in shape having four corners, and said plurality of holes includes four holes adjacent the four corners of said rectangular flange.

4. Apparatus of claim 3, where said flange further includes first and second slots disposed therein on opposing sides thereof, with radially outer sides of said slots open to said opposing sides of said rectangular flange.

5. Apparatus of claim 4, wherein said first and second slots are disposed in said first and second collar portions, respectively, on opposite sides of a plane about which said cylindrical collar means is split.

6. Apparatus of claim 5, wherein: said first and second slots each form notches at ends thereof; and
said holding means includes flexible line means engaging said notches to hold said first and second collar portions together.

7. Apparatus of claim 4, wherein said first and second slots are arcuate slots concentric with said cylindrical collar means.

8. A plant support apparatus, comprising:
first and second collar portion means for forming a cylindrical collar about a stem of a plant, said first and second collar portion means each including flange portions at one end thereof, said flange portions forming a flange extending radially outward from said cylindrical collar in a plane normal to a longitudinal axis of said cylindrical collar;
a first slot disposed in said flange and having a radially outer side thereof open at a side of said flange;
a second slot disposed in said flange and having a radially outer side thereof open at a side of said flange opposite said first slot, said first and second slots being located on opposite sides of a plane about which said cylindrical collar is split, said first and second slots each forming notches at ends thereof; and
flexible line means engaging said notches to hold said first and second collar portions together.

9. A plant support apparatus, comprising:
first and second collar portion means for forming a cylindrical collar about a stem of a plant, said first and second collar portion means each including flange portions at one end thereof, said flange portions forming a flange extending radially outward from said cylindrical collar in a plane normal to a longitudinal axis of said cylindrical collar;

a slot disposed in said flange and having a radially outer side thereof open at a side of said flange;

a vertical support member having a lower end embedded in a ground surface, said support member having a T-shaped cross section with a center leg of said T projecting into said slot; and means for connecting said vertical support member to said flange.

10. A plant support apparatus comprising:

first and second collar portion means for forming a cylindrical collar about a stem of a plant, said first and second collar portion means each including flange portions at one end thereof, said flange portions forming a flange extending radially outward from said cylindrical collar in a plane normal to a longitudinal axis of said cylindrical collar; and a sheet of resilient material surrounding said stem of said plant between said stem and said cylindrical collar.

* * * * *

UNITED STATES PATENT AND TRADEMARK OFFICE
CERTIFICATE OF CORRECTION

PATENT NO. : 4,249,342
DATED : February 10, 1981
INVENTOR(S) : Wilburn R. Williams It is certified that error appears in the above-identified patent and that said Letters Patent are hereby corrected as shown below:

Column 1, line 65, change "plat" to --plant--;

Column 2, line 36, change "FIG. 2" to --FIG. 1--;

Column 3, line 11, change the word "slot" appearing after "thereof." and before "54" to --Slot--;

Column 3, line 15, after "56a" and before "is" insert --and--;

Column 3, line 37, change the second "54a" appearing therein to --54b--;

Column 4, line 12, change "outwardly" to --outward--;

Signed and Sealed this

Seventh Day of July 1981

[SEAL]

Attest:

RENE D. TEGTMEYER

Attesting Officer

Acting Commissioner of Patents and Trademarks

UNITED STATES PATENT AND TRADEMARK OFFICE
CERTIFICATE OF CORRECTION

PATENT NO. : 4,249,342
DATED : February 10, 1981
INVENTOR(S) : Wilburn R. Williams It is certified that error appears in the above-identified patent and that said Letters Patent is hereby corrected as shown below:

Column 4, lines 16 and 17, delete "collar, said flange including attachment means for attaching".

Signed and Sealed this

Twelfth Day of July 1983

[SEAL]

Attest:

GERALD J. MOSSINGHOFF

Attesting Officer

Commissioner of Patents and Trademarks